US012200415B2

(12) United States Patent
Ho

(10) Patent No.: US 12,200,415 B2
(45) Date of Patent: Jan. 14, 2025

(54) LOUDSPEAKER CABINET-ATTACHED FOLDING SCREEN STRUCTURE

(71) Applicant: OXTI Pte Ltd, Singapore (SG)

(72) Inventor: Chih-Feng Ho, Singapore (SG)

(73) Assignee: OXTI PTE LTD, Singapore (SG)

( * ) Notice: Subject to any disclaimer, the term of this patent is extended or adjusted under 35 U.S.C. 154(b) by 242 days.

(21) Appl. No.: 18/075,384

(22) Filed: Dec. 5, 2022

(65) Prior Publication Data

US 2024/0187766 A1 Jun. 6, 2024

(51) Int. Cl.

*H04R 1/34* (2006.01)
*H04R 1/02* (2006.01)

(52) U.S. Cl.

CPC ............. *H04R 1/025* (2013.01); *H04R 1/026* (2013.01); *H04R 1/345* (2013.01); *H04R 2201/34* (2013.01); *H04R 2420/07* (2013.01); *H04R 2499/10* (2013.01)

(58) Field of Classification Search

CPC . H04R 1/20; H04R 1/32; H04R 1/323; H04R 1/34; H04R 1/345; H04R 1/40; H04R 1/403

See application file for complete search history.

(56) References Cited

U.S. PATENT DOCUMENTS

2023/0283936 A1* 9/2023 Liu ........................ G06F 1/1637 381/388

FOREIGN PATENT DOCUMENTS

KR 20010012592 A * 2/2001

* cited by examiner

*Primary Examiner* — Kile O Blair
(74) *Attorney, Agent, or Firm* — Leong C. Lei

(57) ABSTRACT

A loudspeaker cabinet-attached folding screen structure includes: a folding screen, which includes a plurality of panels that are arranged in a parallel manner; and a loudspeaker cabinet, which is arranged between the plurality of panels. The plurality of panels are rotatably connected to the loudspeaker cabinet. The loudspeaker cabinet includes a loudspeaker, a driver circuit, and a first wireless transmission circuit that is electrically connected with the loudspeaker and the first wireless transmission circuit. As such, the user may simply adjust the folding screen to make the sound waves emitting from the loudspeaker cabinet impinging the plurality of panels to develop reflection, and the reflection of the sound waves by the plurality of panels induces delay to make the user hear clearer. Repetitive reflection of the sound waves by the plurality of panels induce reverberation, which makes the sound exhibiting a sense of distance and a sense of space.

5 Claims, 8 Drawing Sheets

LOUDSPEAKER CABINET-ATTACHED FOLDING SCREEN STRUCTURE

TECHNICAL FIELD OF THE INVENTION

The present invention relates generally to a folding screen structure, and more particularly to loudspeaker cabinet-attached folding screen structure.

DESCRIPTION OF THE PRIOR ART

A known folding screen is shown in FIG. 1. The known folding screen include multiple panels 100, and shows just only functions of shielding or decoration. The functions are limited, and there is still room for improvement.

SUMMARY OF THE INVENTION

In view of the above, the present invention aims to provide a loudspeaker cabinet-attached folding screen structure, which comprises: a folding screen, which comprises a plurality of panels, the plurality of panels being arranged in a parallel manner; and a loudspeaker cabinet, which is arranged between the plurality of panels, the plurality of panels being connected, in a rotatable manner, to the loudspeaker cabinet, the loudspeaker cabinet comprising at least one loudspeaker, a driver circuit, and a first wireless transmission circuit arranged therein, the driver circuit being electrically connected with the loudspeaker and the first wireless transmission circuit.

In the above arrangement, the plurality of panels of the folding screen are rotatably connected by a plurality of rotating axles to the loudspeaker cabinet.

In the above arrangement, the plurality of panels are provided at one side thereof with a support portion.

In the above arrangement, the first wireless transmission circuit comprises a radio frequency transmission circuit or a Bluetooth transmission circuit.

In the above arrangement, the first wireless transmission circuit is operable to receive a wireless control signal transmitted from an electronic device. The electronic device can be a mobile phone or a remote control.

As such, a user may simply adjust the folding screen to make the sound waves emitting from the loudspeaker cabinet impinging the plurality of panels to develop reflection, and the reflection of the sound waves by the plurality of panels induces delay to make the user hear clearer. Repetitive reflection of the sound waves by the plurality of panels induce reverberation, which makes the sound exhibiting a sense of distance and a sense of space.

DETAILED DESCRIPTION OF THE PREFERRED EMBODIMENT

Figure 1:
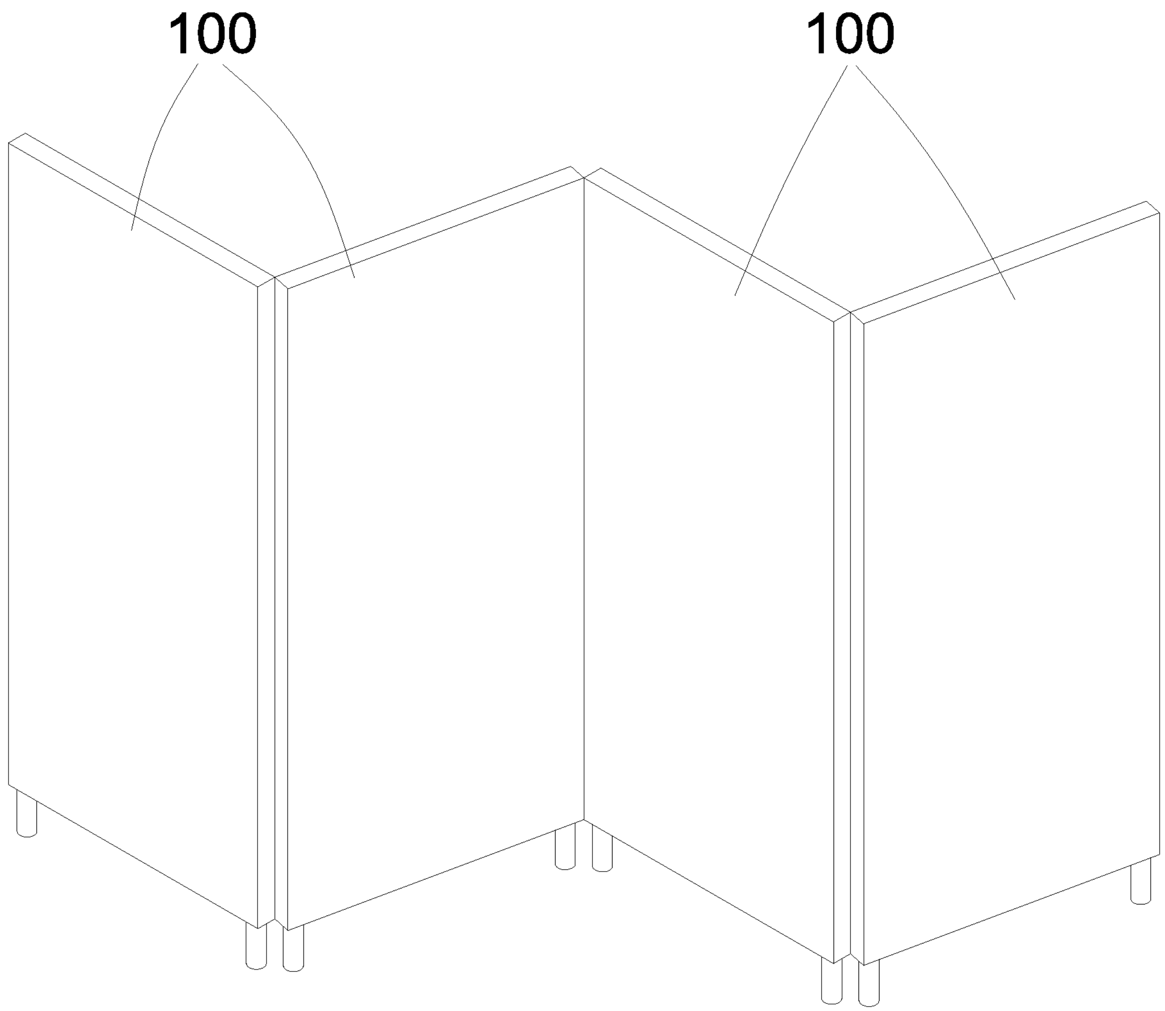
PRIOR ART FIG. 1
FIG. 1 is a schematic view showing the prior art.
Figure 2:
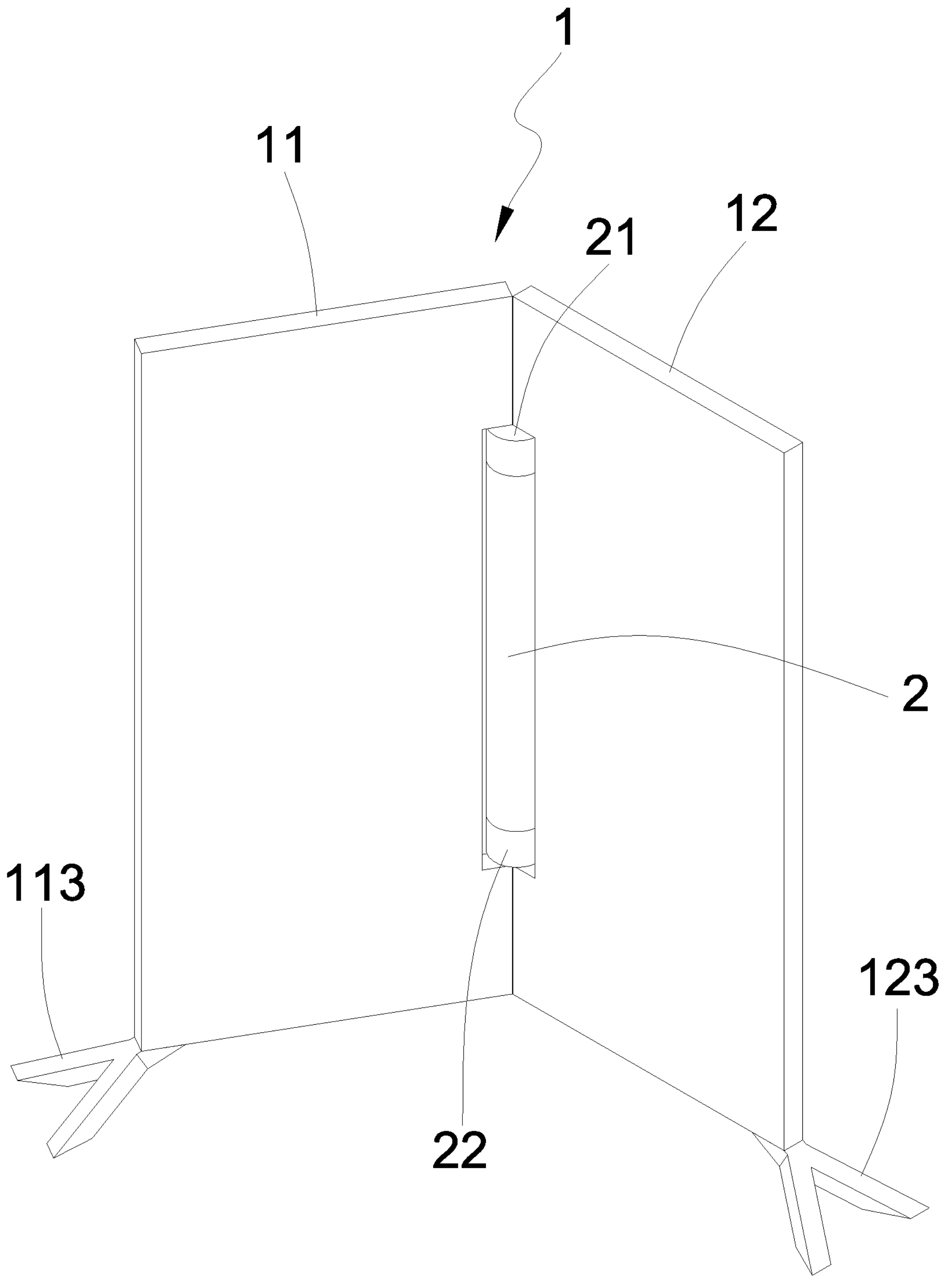
FIG. 2 is a perspective view showing a loudspeaker cabinet-attached folding screen structure according to the present invention in an assembled form.
Figure 3:
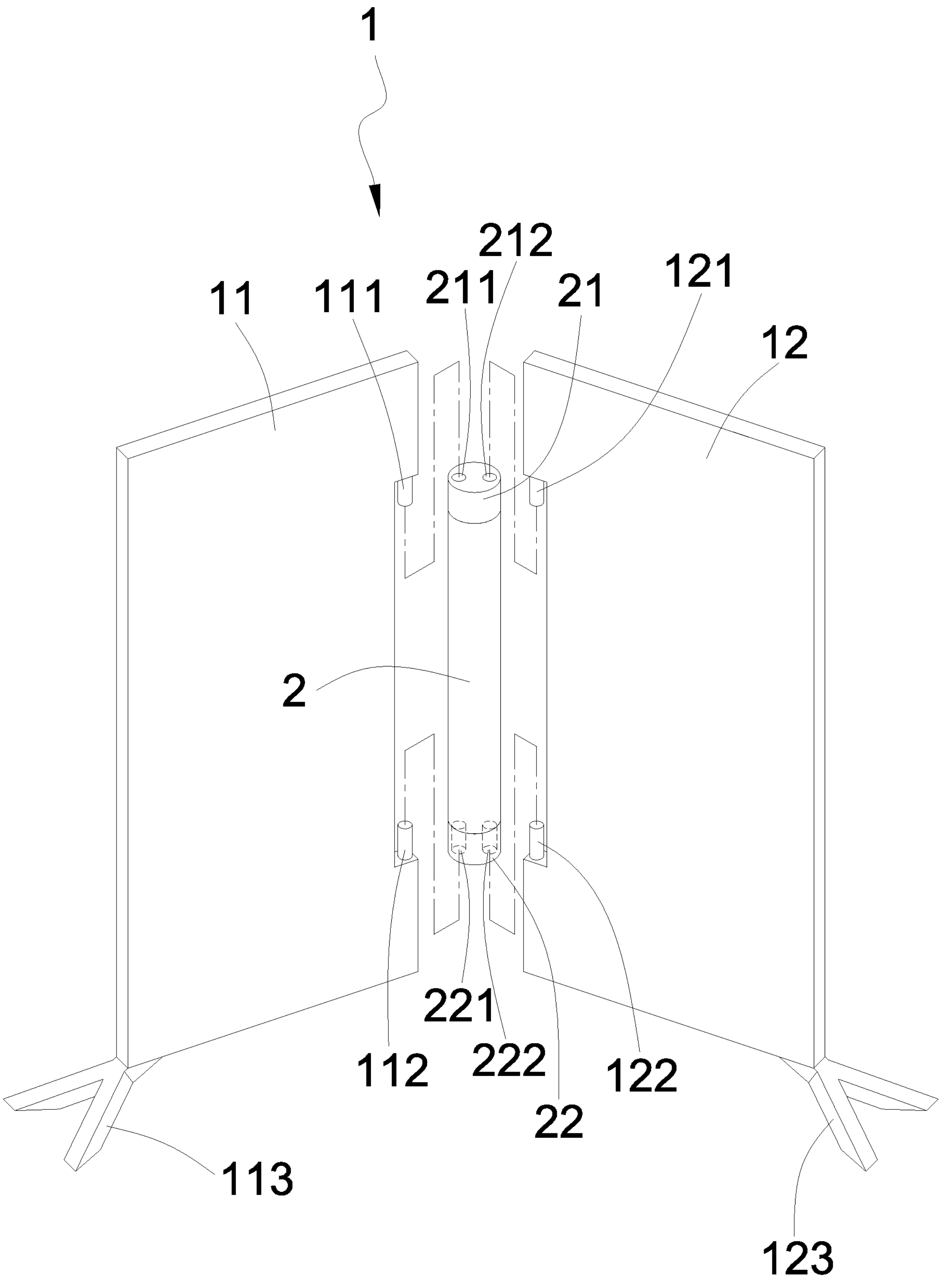
FIG. 3 is an exploded view showing the loudspeaker cabinet-attached folding screen structure according to the present invention.

Referring to FIGS. 2 and 3, the present invention provides a loudspeaker cabinet-attached folding screen structure, which comprises: a folding screen 1 and a loudspeaker cabinet 2.

The folding screen 1 comprises a plurality of panels, and the plurality of panels are arranged in a parallel manner. The plurality of panels of the folding screen 1 are respectively connected, in a rotatable manner, by a plurality of rotating axles to the loudspeaker cabinet 2. The plurality of panels are provided, on one side thereof, with a support portion.

Figure 4:
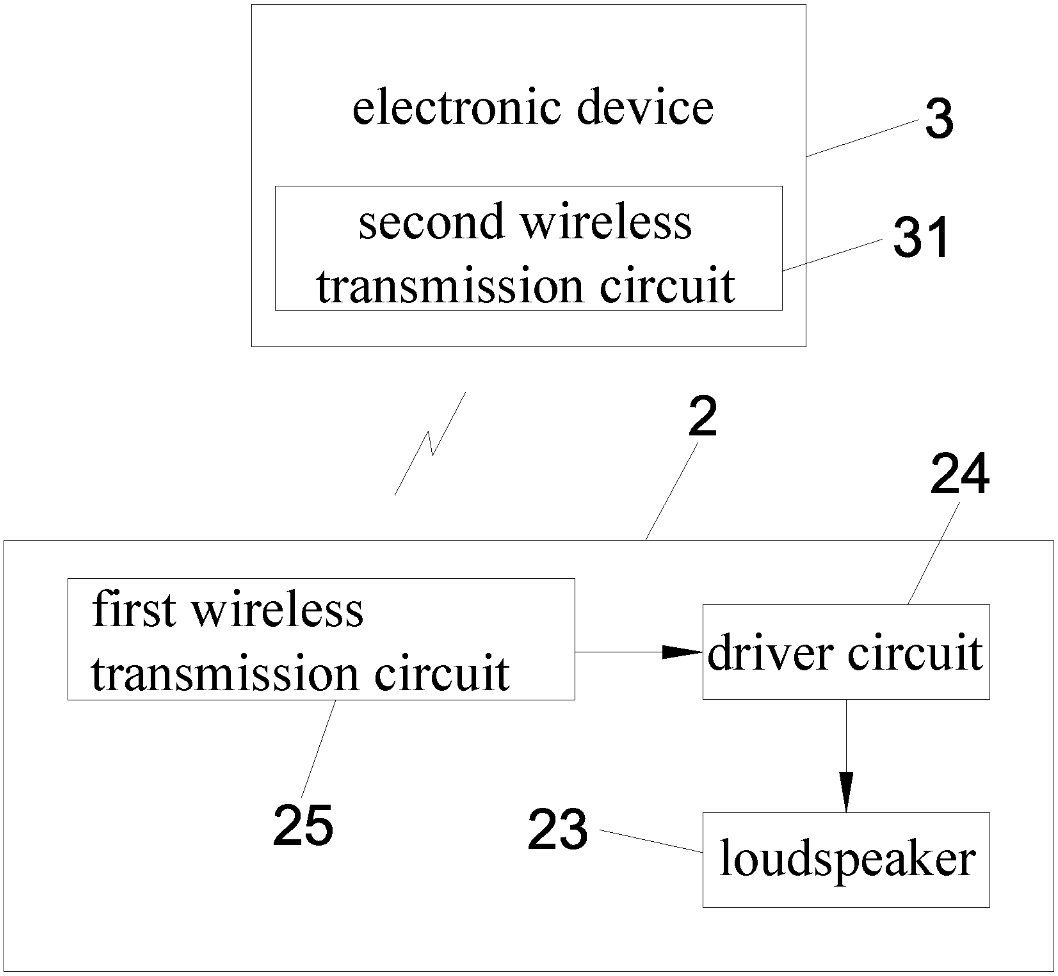
FIG. 4 is a block diagram showing a loudspeaker according to the present invention and an electronic device.

Referring to FIGS. 2 and 4, the loudspeaker cabinet 2 is arranged between the plurality of panels, and the plurality of panels are rotatably connected to the loudspeaker cabinet 2. The loudspeaker cabinet 2 is provided, in an interior thereof, with at least one loudspeaker 23, a driver circuit 24, and a first wireless transmission circuit 25. The driver circuit 24 is electrically connected with the loudspeaker 23 and the first wireless transmission circuit 25. The first wireless transmission circuit 25 can be a radio frequency transmission circuit or a Bluetooth transmission circuit. The first wireless transmission circuit 25 is capable of receiving a wireless control signal transmitted from an electronic device 3. The electronic device 3 can be a mobile phone or a remote control.

Referring further to FIG. 3, the plurality of panels may comprise a first panel 11 and a second panel 12. The first panel 11 is provided with a first rotating axle 111 and a second rotating axle 112, and the second panel 12 is provided with a third rotating axle 121 and a fourth rotating axle 122. The loudspeaker cabinet 2 has a first end 21 and a second end 22. The first end 21 and the second end 22 of the loudspeaker cabinet 2 are respectively formed with a first axle hole 211 and a second axle hole 221, and the first end 21 and the second end 22 of the loudspeaker cabinet 2 are also respectively formed with a third axle hole 212 and a fourth axle hole 222. To assemble the folding screen 1 and the loudspeaker cabinet 2 together, the first rotating axle 111 is inserted into the first axle hole 211; the second rotating axle 112 is inserted into the second axle hole 221; the third rotating axle 121 is inserted into the third axle hole 212; and the fourth rotating axle 122 is inserted into the fourth axle hole 222, so that the plurality of panels of the folding screen 1 are rotatably connected to the loudspeaker cabinet 2. Alternatively, the panels of the folding screen 1 are formed with axle holes, while the loudspeaker cabinet 2 is provided with rotating axles, or any other feasible arrangements that allow the plurality of panels to be connected to the loudspeaker cabinet 2 in a rotatable manner.

The first panel 11 is provided with a first support portion 113, and the second panel 12 is provided with a second support portion 123. The first support portion 113 and the second support portion 123 are provided to securely hold the first panel 11 and the second panel 12 in position, without affecting handling the folding screen 1 through pushing and pulling.

Referring further to FIG. 4, the electronic device 3 may include a second wireless transmission circuit 31, which is operable to implement wireless transmission with the first wireless transmission circuit 25 of the loudspeaker cabinet 2. The electronic device 3 issues a wireless control signal that is transmitted in a wireless manner to the loudspeaker cabinet 2, and the first wireless transmission circuit 25 of the loudspeaker cabinet 2 receives the wireless control signal. Then, the driver circuit 24 drives the at least one loudspeaker 23 according to contents of the wireless control signal, so as to activate the at least one loudspeaker 23 to operate, such as playing back sounds or adjusting sound volume.

Figure 5:
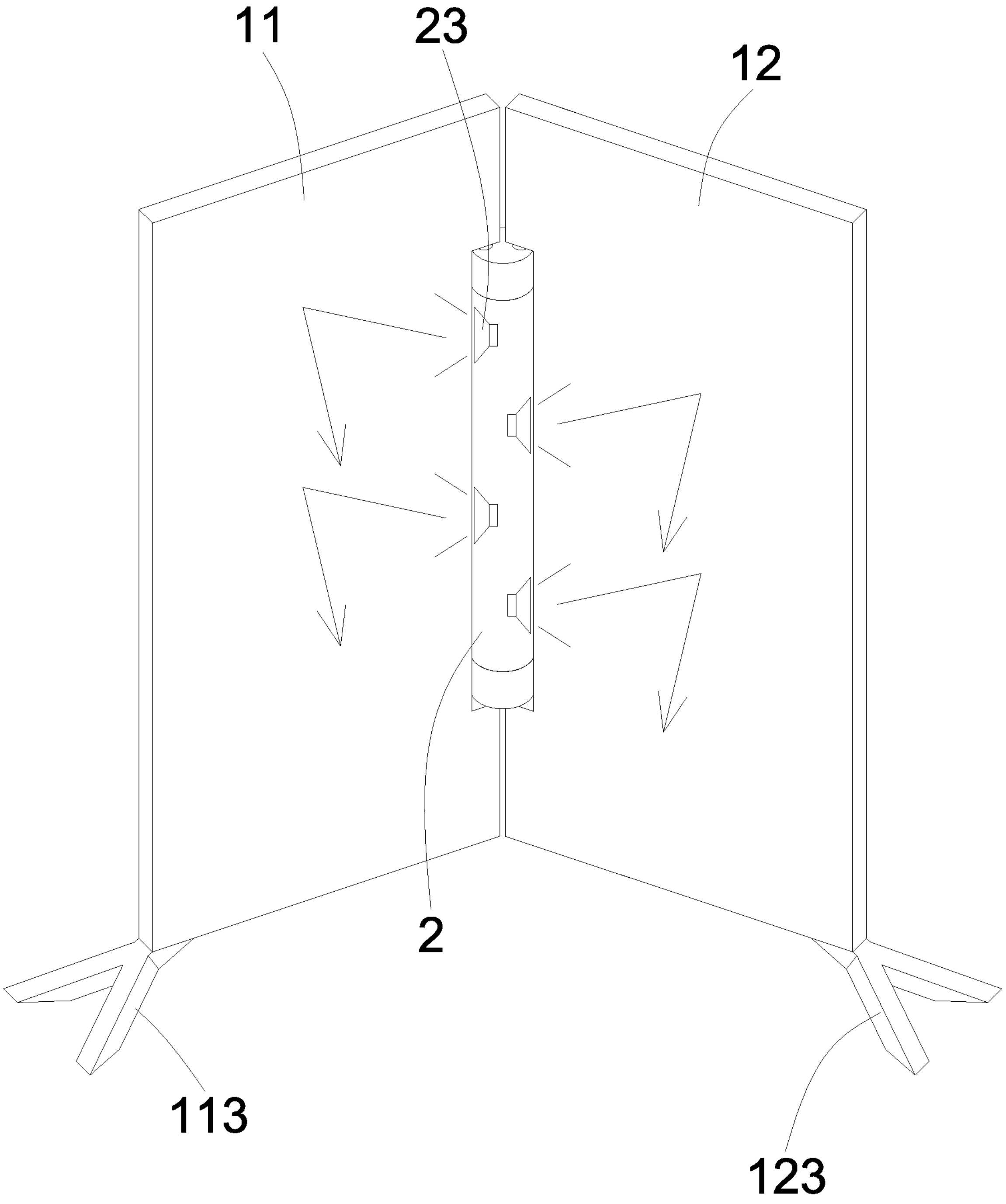
FIG. 5 is a schematic view showing reflection of sound waves generated by the loudspeaker cabinet according to the present invention impinging a folding screen.

Referring further to FIG. 5, a user may adjust the folding screen 1, such that sound waves emitting from the loudspeaker cabinet 2 may impinge the plurality of panels to generate reflection. The reflection of the sound waves by the plurality of panels generally causes delay, so as to allow the user to hear more clearly. The sound waves may be repetitively reflected by the plurality of panels to develop reverberation, allowing the sounds to exhibit a sense of distance and a sense of space. The sound waves of the loudspeaker cabinet 2 spreads in the form of spherical waves, and when the sound waves impinge the first panel 11 and the second panel 12, a majority of the sound waves is reflected, while a minority of the sound waves is absorbed. The reflection of the sound waves by the first panel 11 and the second panel 12 causes delay, which is commonly acknowledge as echo. Since the human ears and brain have only limited speeds, the delay of sound allows the user to hear clearer.

Figure 6:
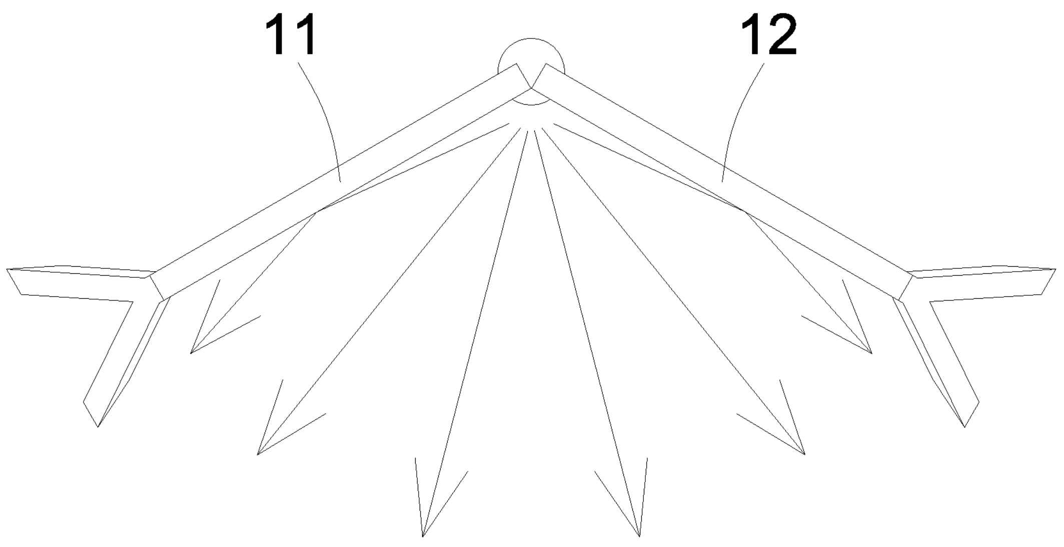
FIG. 6 is a schematic view illustrating adjusting an included angle of multiple panels to become large according to the present invention.
Figure 7:
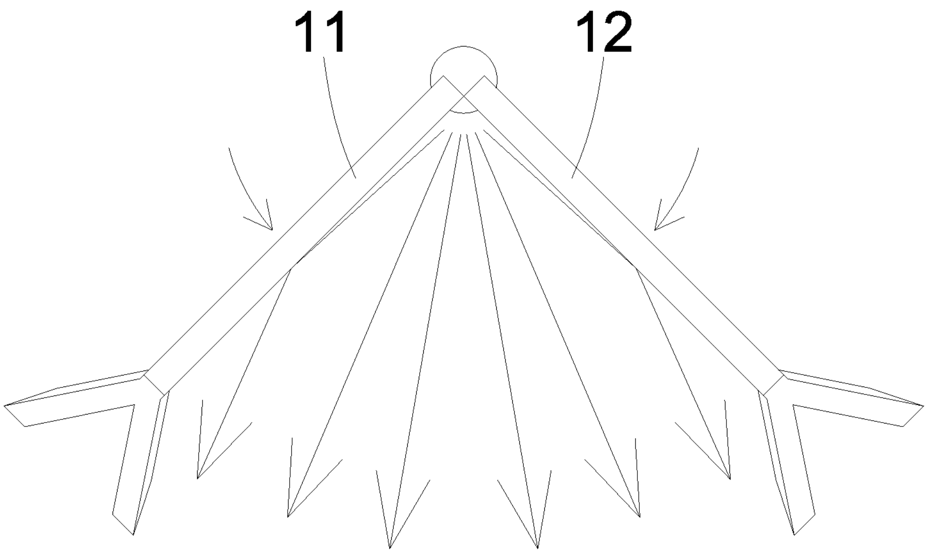
FIG. 7 is a schematic view illustrating adjusting an included angle of multiple panels to become small according to the present invention.
Figure 8:
FIG. 8 is a schematic view illustrating multiple ones of the present invention being used in combination with each other.

Repetitive reflection of the sound waves on the first panel 11 and the second panel 12 develops echo and re-echo. After the loudspeaker cabinet 2 stops sounding, the user may still feel as if the sound persists for a certain period of time (sound sustaining), this effect being commonly referred to as "reverberation", which makes the sound exhibit a sense of distance and a sense of space. In other words, after the loudspeaker cabinet 2 stops, the user, if perceiving the sound lasting for a relatively short period of time, would feel the sound is relatively close and the space is relatively small; and after the loudspeaker cabinet 2 stops, the user, if perceiving the sound lasting for a relatively long period of time, would feel the sound is relatively far and the space is relatively large, this creating a sense of distance and a sense of space for the sound. The user may adjust an angle between the first panel 11 and the second panel 12 to make desired reflection of the sound waves emitting from the loudspeaker cabinet 2 in impinging the plurality of panel (as demonstrated in FIGS. 6 and 7). And, further, a personal sound field can be built up by combing multiple sets of the present invention to better the sense of distance and the sense of space for the sound, as shown in FIG. 8.

As such, the user may simply adjust the folding screen 1 to make the sound waves emitting from the loudspeaker cabinet 2 impinging the plurality of panels to develop reflection, and the reflection of the sound waves by the plurality of panels induces delay to make the user hear clearer. Repetitive reflection of the sound waves by the plurality of panels induce reverberation, which makes the sound exhibiting a sense of distance and a sense of space. Further, the invention can also be used as a decoration as that is usually used.

I claim:

1. A loudspeaker cabinet-attached folding screen structure, comprising:

a folding screen, which comprises a plurality of panels, the plurality of panels being arranged in a parallel manner; and a loudspeaker cabinet, which is arranged between the plurality of panels, the plurality of panels being connected, in a rotatable manner, to the loudspeaker cabinet, the loudspeaker cabinet comprising at least one loudspeaker, a driver circuit, and a first wireless transmission circuit arranged therein, the driver circuit being electrically connected with the loudspeaker and the first wireless transmission circuit.

2. The loudspeaker cabinet-attached folding screen structure according to claim 1, wherein the plurality of panels of the folding screen are rotatably connected by a plurality of rotating axles to the loudspeaker cabinet.

3. The loudspeaker cabinet-attached folding screen structure according to claim 1, wherein the plurality of panels are provided at one side thereof with a support portion.

4. The loudspeaker cabinet-attached folding screen structure according to claim 1, wherein the first wireless transmission circuit comprises a radio frequency transmission circuit or a Bluetooth transmission circuit.

5. The loudspeaker cabinet-attached folding screen structure according to claim 1, wherein the first wireless transmission circuit is adapted to receive a wireless control signal transmitted from an electronic device, the electronic device being a mobile phone or a remote control.

* * * * *